(12) United States Patent
Sahashi

(10) Patent No.: US 8,752,892 B2
(45) Date of Patent: Jun. 17, 2014

(54) VEHICLE SEAT

(75) Inventor: Hideo Sahashi, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 98 days.

(21) Appl. No.: 13/440,181

(22) Filed: Apr. 5, 2012

(65) Prior Publication Data

US 2012/0256450 A1 Oct. 11, 2012

(30) Foreign Application Priority Data

Apr. 7, 2011 (JP) ................................. 2011-085309

(51) Int. Cl.
*A47C 7/72* (2006.01)

(52) U.S. Cl.
USPC ................................. 297/180.14; 297/180.13

(58) Field of Classification Search
USPC ................ 454/120, 907; 297/180.14, 180.13, 297/180.1
See application file for complete search history.

(56) References Cited

U.S. PATENT DOCUMENTS

| | | | |
|---|---|---|---|
| 2,430,335 A * | 11/1947 | Hart ............................... | 454/120 |
| 4,685,727 A * | 8/1987 | Cremer et al. ............ | 297/180.14 |
| 4,729,598 A * | 3/1988 | Hess ......................... | 297/180.14 |
| 5,924,766 A * | 7/1999 | Esaki et al. .............. | 297/180.13 |
| 6,179,706 B1 * | 1/2001 | Yoshinori et al. ............. | 454/120 |
| 6,189,966 B1 * | 2/2001 | Faust et al. ............... | 297/180.14 |
| 6,277,023 B1 * | 8/2001 | Schwarz ....................... | 454/120 |
| 6,604,785 B2 * | 8/2003 | Bargheer et al. ......... | 297/180.14 |
| 6,848,742 B1 * | 2/2005 | Aoki et al. ............... | 297/180.14 |
| 6,869,140 B2 * | 3/2005 | White et al. ............. | 297/180.13 |
| 7,753,440 B2 * | 7/2010 | Zeyen et al. ............. | 297/180.14 |
| 7,963,595 B2 * | 6/2011 | Ito et al. .................... | 297/180.14 |
| 8,393,162 B2 * | 3/2013 | Chung .......................... | 62/3.61 |
| 2003/0160479 A1 * | 8/2003 | Minuth et al. ........... | 297/180.14 |
| 2009/0031742 A1 * | 2/2009 | Seo et al. .................. | 297/180.14 |
| 2009/0218855 A1 * | 9/2009 | Wolas ....................... | 297/180.14 |
| 2010/0176627 A1 * | 7/2010 | Lazanja et al. ........... | 297/180.12 |

(Continued)

FOREIGN PATENT DOCUMENTS

| | | |
|---|---|---|
| CN | 2543426 | 4/2003 |
| CN | 2628322 | 7/2004 |

(Continued)

OTHER PUBLICATIONS

U.S. Appl. No. 13/440,202 to Hideo Sahashi, which was filed Apr. 5, 2012.

(Continued)

*Primary Examiner* — Jose V Chen
(74) *Attorney, Agent, or Firm* — Greenblum & Bernstein, P.L.C.

(57) ABSTRACT

A vehicle seat includes a seat cushion, a seat back that is connected to the seat cushion in a manner so as to be reclined and raised with respect to the seat cushion, a lower band member that covers a connecting portion of the seat cushion and the seat back, and a supply portion provided in the lower band member. The seat back includes a cushion that forms a contour of a seat, a cover, and a blower arranged inside the seat back. Air blown from the blower is blown toward a sitting side of the seat back via a flow path portion of the cushion, while outside air is supplied to the blower. The supply portion communicates an inside of the seat back with an outside of the seat back, and outside air taken in from the supply portion is supplied to the blower.

6 Claims, 9 Drawing Sheets

(56) References Cited

U.S. PATENT DOCUMENTS

| | | | | |
|---|---|---|---|---|
| 2010/0289302 | A1* | 11/2010 | Cheng | 297/180.12 |
| 2011/0133525 | A1 | 6/2011 | Oota | |
| 2012/0256451 | A1* | 10/2012 | Sahashi | 297/180.14 |

FOREIGN PATENT DOCUMENTS

| | | |
|---|---|---|
| CN | 201068119 | 6/2008 |
| JP | 2004-196286 | 7/2004 |
| JP | 2004-224108 | 8/2004 |
| JP | 2005-34345 | 2/2005 |
| JP | 2009-291310 | 12/2009 |

OTHER PUBLICATIONS

U.S. Appl. No. 13/448,664 to Hideo Sahashi, which was filed Apr. 17, 2012.

Chinese Office action, dated Feb. 20, 2014 along with an English-language translation thereof.

* cited by examiner

VEHICLE SEAT

INCORPORATION BY REFERENCE

The disclosure of Japanese Patent Application No. 2011-085309 filed on Apr. 7, 2011 including the specification, drawings and abstract is incorporated herein by reference in its entirety.

BACKGROUND OF THE INVENTION

1. Field of the Invention

The invention relates to a vehicle seat provided with a blower therein.

2. Description of Related Art

The vehicle seat described in Japanese Patent Application Publication No. 2009-291310 (JP 2009-291310 A) is one example of a vehicle seat provided with a blower therein. This vehicle seat has a seat cushion, a seat back, and a blower. The seat back is a member that is connected to the seat cushion in a manner such that the seat back is able to be reclined and raised, and includes a cushion that forms the outer shape (i.e., the contour) of the seat, a flow path portion (such as air holes) provided in the cushion, and a cover made of fabric. Also, the blower includes a centrifugal blower mechanism (a mechanism that blows air in the centrifugal direction while drawing in outside air from the axial direction of the apparatus). In this related art, the cushion and the blower are covered by the cover after the blower is arranged in the seat back (on the back side of the cushion when viewed from the front of the seat back). The blower blows out air while drawing in outside air through the cover (i.e., the gaps between threads) of the back of the seat. The air that is blown out from the blower is blown at an occupant through the flow path portion of the cushion.

However, with the related art, the blower draws in outside air through the cover of the back of the seat. As a result, the structure of the related art is not easily able to be employed, taking into account the appearance of the seat (seat performance) and the fact that dirt and dust and the like outside the seat tend to adhere to the back of the seat. A back board (a resin plate) may also be arranged on the back of the seat, and a supply port for taking in outside air may be provided in the center of this back board. However, in this case, the supply port would be in plainly visible from behind the seat, thus diminishing the seat performance somewhat.

SUMMARY OF THE INVENTION

The invention thus provides a vehicle seat that supplies outside air to a blower while maintaining seat performance as much as possible.

A first aspect of the invention relates to a vehicle seat that includes a seat cushion and a seat back that is connected to the seat cushion in a manner so as to be reclined and raised with respect to the seat cushion. The seat back includes a cushion that forms a contour of a seat, a cover that covers a surface of the seat, and a blower arranged inside the seat back. Air blown out from the blower is blown toward a sitting side of the seat back via a flow path portion of the cushion, while outside air is supplied to the blower. In addition, the vehicle seat includes a lower band member that covers a connecting portion of the seat cushion and the seat back, and a supply portion that is provided in the lower band member and communicates an inside of the seat back with an outside of the seat back. Outside air taken in from the supply portion is supplied to the blower.

According to this aspect, providing the supply portion in the lower band member (i.e., in a position where it does not really stand out) makes it possible to supply outside air to the blower while minimizing outside air that has passed through the cover from being drawn in. Moreover, outside air is able to be supplied to the blower while maintaining seat performance (the appearance and the like of the seat) as much as possible.

In the first aspect, the supply portion may be a resin member that is inserted into a hole in the lower band member, and the lower band member may be a planar-shaped member that is more rigid than the cover is.

According to this structure, the supply portion is able to be attached in a stable and aesthetically pleasing manner.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
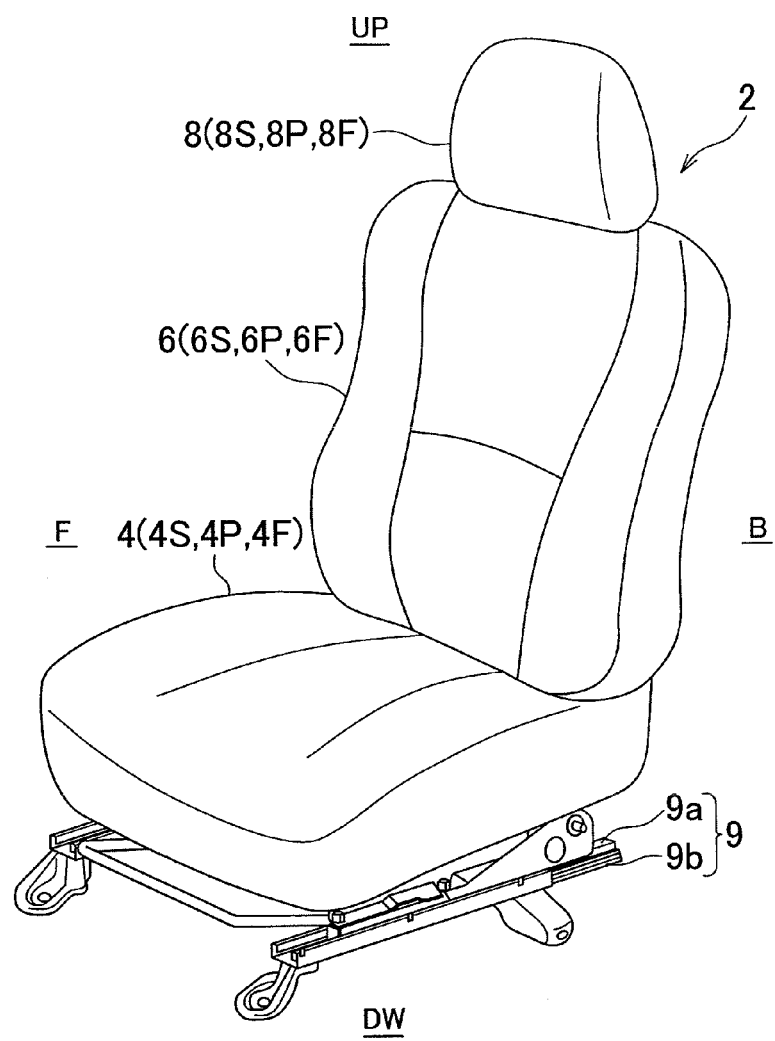
FIG. 1 is a perspective view of a vehicle seat according to a first example embodiment of the invention.

Hereinafter, an example embodiment of the invention will be described with reference to FIGS. 1 to 9. In the drawings, reference character F denotes a forward direction with respect to the vehicle seat, reference character B denotes a backward or rearward direction with respect to the vehicle seat, reference character UP denotes an upward direction with respect to the vehicle seat, and reference character DW denotes a downward direction with respect to the vehicle seat. A vehicle seat 2 in FIG. 1 has seat structure members (i.e., a seat cushion 4, a seat back 6, and a headrest 8), and a rail member 9. Each of these seat structure members has a frame member (4F, 6F, and 8F) that forms a seat frame, a cushion (4P, 6P, and 8P) that forms the outer shape (i.e., the contour) of the seat, and a cover (4S, 6S and 8S) that covers the surface of the seat.

The rail member 9 includes an upper rail 9a, and a lower rail 9b that is slidably mounted to the upper rail 9a. The vehicle seat 2 is able to slide on the lower rail 9b by attaching the seat cushion 4 to the upper rail 9a. Also, the headrest 8 is a member that is arranged on an upper portion of the seat back 6, and includes a pair of stay members, not shown. The headrest 8 is attached to the upper portion of the seat back 6 by inserting the pair of stay members into cylindrical members, also not shown, in the seat back 6.

<First Example Embodiment>

Figure 8:
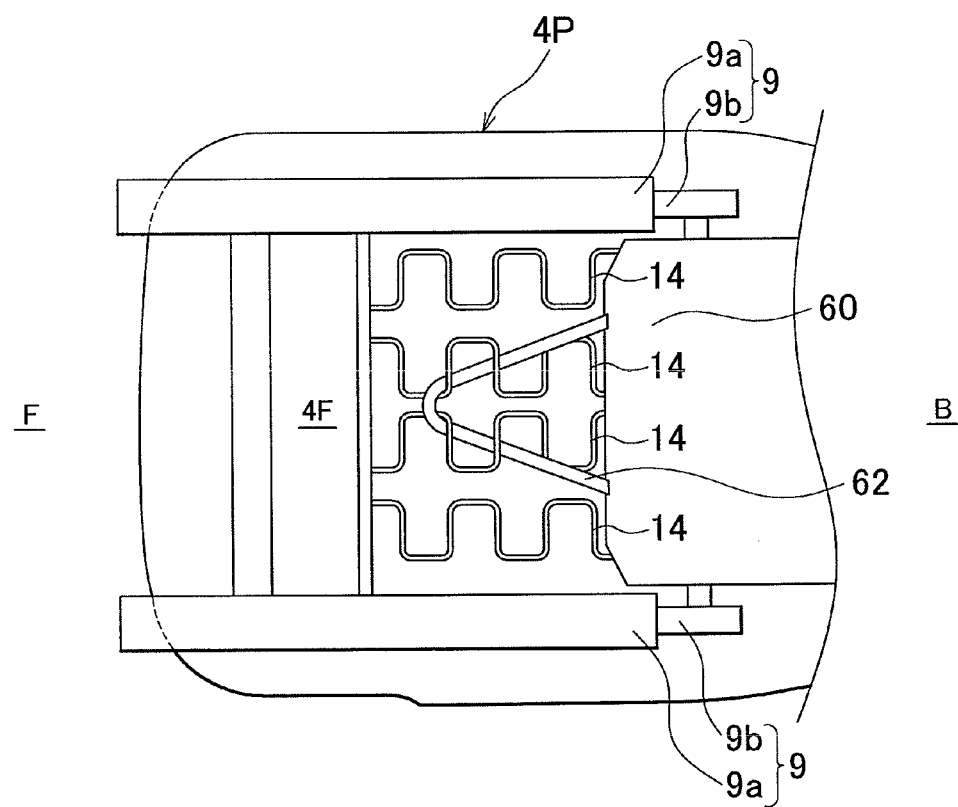
FIG. 8 is a back view of a portion of a seat cushion of the vehicle seat.
Figure 9:
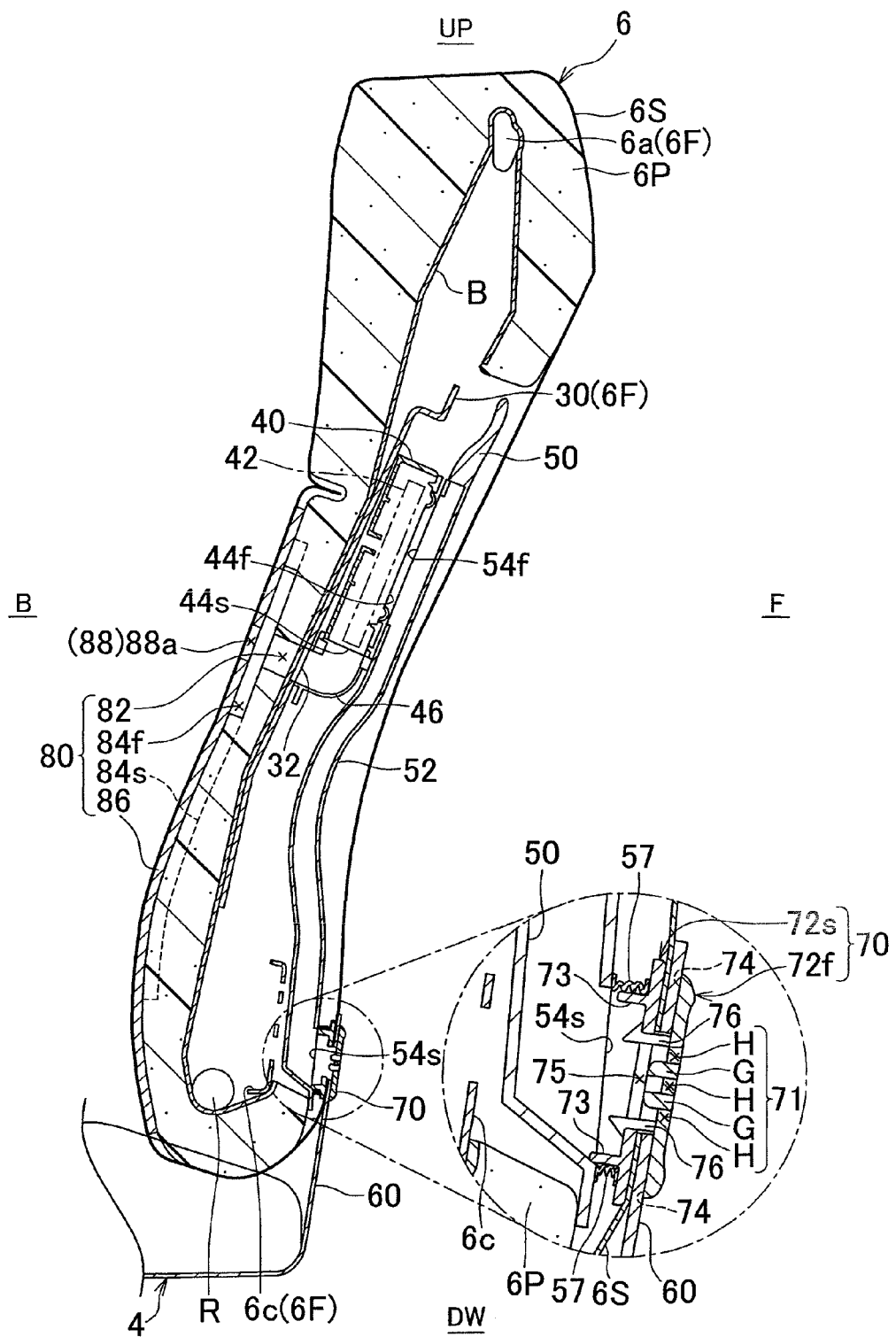
FIG. 9 is a longitudinal sectional view of a seat back according to a second example embodiment of the invention.

The seat cushion 4 has an S-spring 14 (a wire member that is bent in a general S-shape (see FIGS. 1 and 8). In this example embodiment, a plurality of these S-springs 14 are arranged on the back side of the seat cushion 4 and attached to the frame member 4F. The seat back 6 (that will be described in detail later) is a member that is connected to the seat cushion 4 in a manner such that the seat back 6 is able to be reclined and raised, and houses a blower 40 that will be described later (see FIGS. 1 and 3). In this example embodiment, air blown out from the blower 40 is blown at an occupant, while outside air is supplied to the blower 40 inside the seat back 6. With this type of seat structure, outside air is preferably able to be supplied to the blower 40 while maintaining seat performance (e.g., appearance) as much as possible. Therefore, in this example embodiment, outside air is supplied to the blower 40 while maintaining seat performance as much as possible with the structure described below. The various structures will now be described in detail.

[Seat Back]

The seat back 6 of this example embodiment includes basic structures (i.e., the frame member 6F, the cover 6S, the cushion 6P), the blower 40, a duct member 50, a lower band member 60, a supply portion 70, and a flow path portion 80 (each of these members will be described in detail later; see FIGS. 2 to 7). Also, after the blower 40 is installed on the frame member 6F, the cushion 6P is arranged on the frame member 6F and covered by the cover 6S (see FIGS. 2 and 3). Next, air that is blown out from the blower 40 is blown at the occupant through the flow path portion 80, while outside air is supplied to the blower 40 through the duct member 50 from the lower band member 60 (i.e., the supply portion 70).

(Frame Member)

Figure 2:
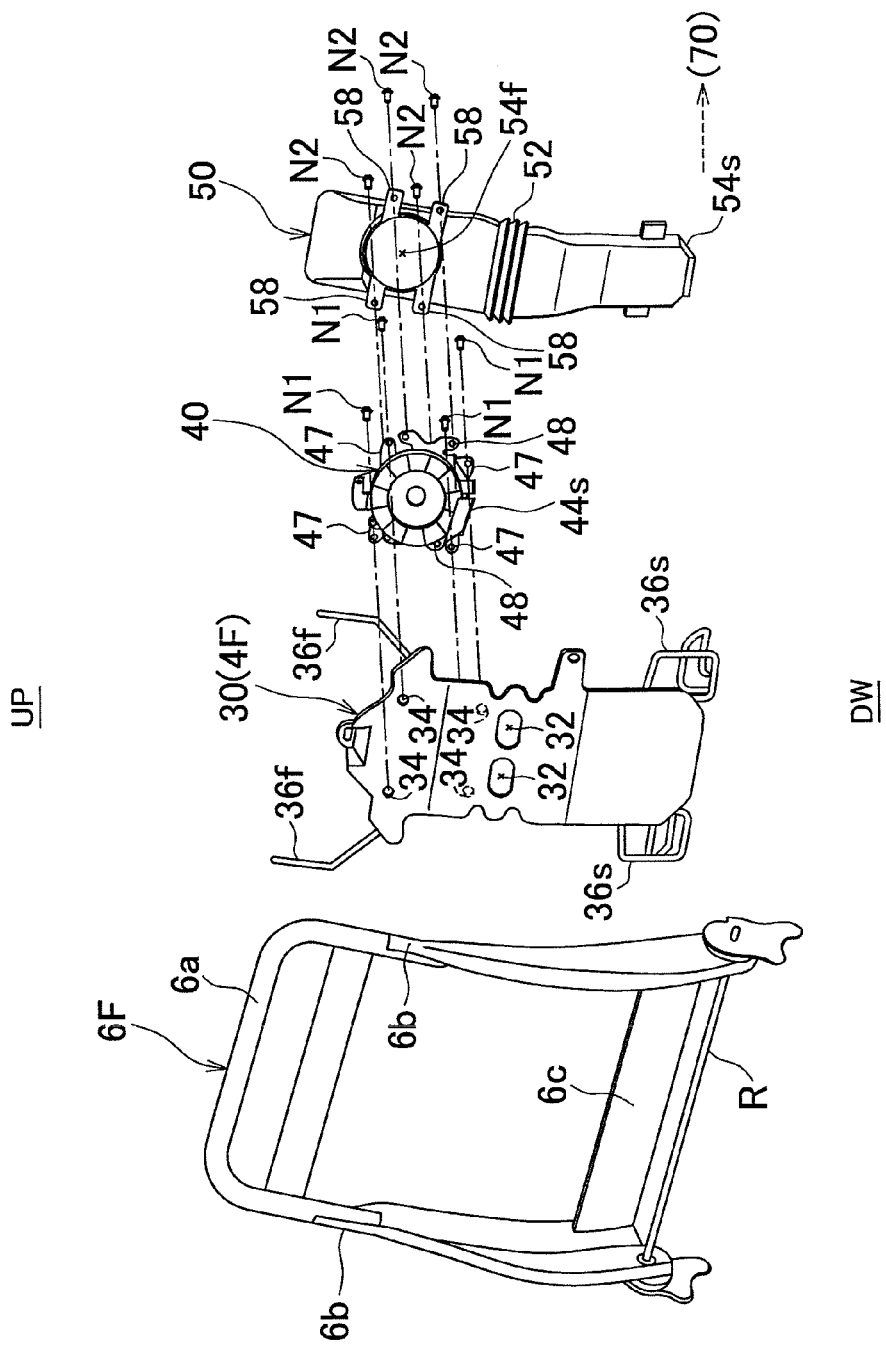
FIG. 2 is an exploded perspective view of a portion of a seat back of the vehicle seat.

The frame member 6F (an arch-shaped frame member) includes an upper frame 6a, a pair of side frames 6b, a lower frame 6c, a reclining shaft R, and a support bracket 30 (see FIG. 2). The upper frame 6a is a member (having a generally inverted U-shape when viewed from the front) that forms the upper portion of the seat. Also, the lower frame 6c is a flat plate member that extends between the pair of side frames 6b at a lower portion of the seat. The pair of side frames 6b are flat plate members that form seat side portions. Each of the side frames 6b is a flat plate member that forms a side portion of the seat and is attached to a corresponding lower end of the upper frame 6a. The reclining shaft R is attached extending between the pair of side frames 6b, near the lower ends of the side frames 6b. The reclining shaft R is the rotational center when the seat back 6 is reclined and raised with respect to the seat cushion 4 (see FIG. 1).

(Support Bracket)

The support bracket 30 is a flat plate member (having a generally rectangular shape), and includes a pair of communicating holes 32, receiving members 34, a pair of first wires 36f, and a pair of second wires 36s (see FIG. 2). The pair of communicating holes 32 are through-holes, each of which can be communicated with the blower 40 (that will be described later), and may be provided in the center of the support bracket 30. Also, the receiving members 34 are holes (either through-holes or non-through holes) into which screw members N1 can be inserted, and may be provided above the communicating holes 32.

Also, the pair of first wires 36f are generally L-shaped wire members that are attached to upper portions on both ends of the support bracket 30 and extend upward with respect to the seat. Also, the pair of second wires 36s are wire members (having a generally inverted Y-shape when viewed from the side) bent so as to sandwich the lower frame 6c, that are attached to lower portions on both ends of the support bracket 30 and extend downward with respect to the seat. In this example embodiment, the pair of first wires 36f are attached to the upper frame 6a and the pair of second wires 36s are attached to the lower frame 6c, while the support bracket 30 is arranged inside the frame member 6F. Also, the blower 40 that will be described later is attached to the upper portion (i.e., above the communicating holes 32) of the support bracket 30.

(Blower)

Figure 3:
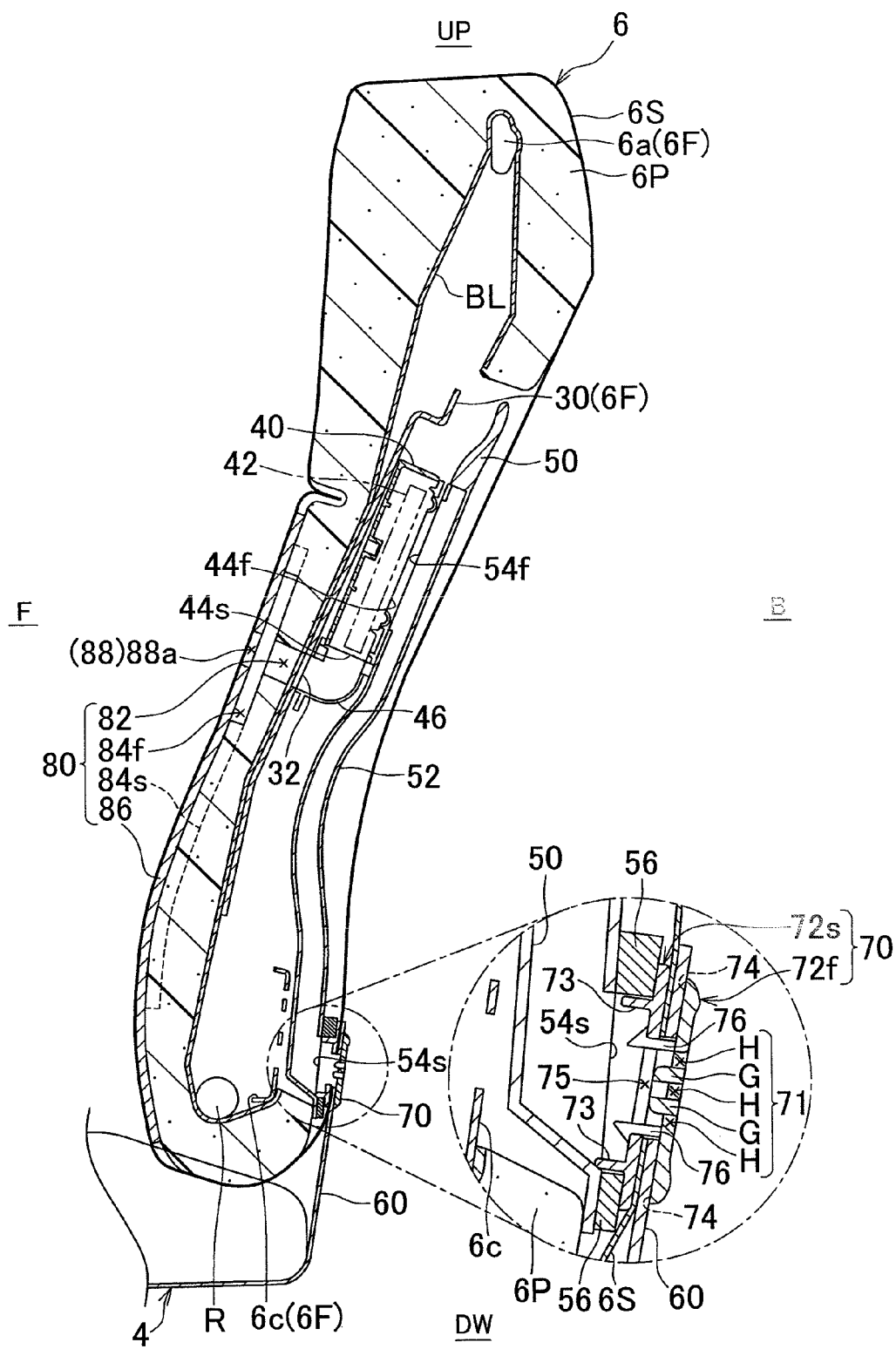
FIG. 3 is a longitudinal sectional view of the seat back of the vehicle seat.

The blower 40 is a hollow case (having a short cylinder shape) that includes a blower mechanism 42, a first opening 44f, a second opening 44s, pipe member 46, a basic mounting portion 47, and a first mounting portion 48 (see FIGS. 2 and 3). The pipe member 46 (typically bellows-shaped) is a pipe member that communicates the blower 40 with the flow path portion 80 (that will be described later). The blower mechanism 42 is a small diameter cylindrical member that is able to be housed in the blower 40. A centrifugal mechanism (i.e., a mechanism that blows air out in the centrifugal direction while drawing air in from the axial direction of the apparatus), for example, may be used as the blower mechanism 42. A multi-blade fan (a sirrocco fan), a plate fan, a turbo fan, an airfoil fan, and a limit load fan are examples that may be used as this type of blower mechanism 42.

Also, the first opening 44f is a through-hole formed in the back surface of the blower 40 (i.e., in the axial direction of the apparatus), that is able to supply air (outside air) to the blower mechanism 42. Also, the second opening 44s is a through-hole formed in the peripheral surface (i.e., in the centrifugal direction of the apparatus) of the blower 40, that is able to expel (i.e., blow) the air blown from the blower mechanism 42 outside the apparatus. Also, the basic mounting portion 47 is a flat plate portion that protrudes radially outward from the blower 40, and has screw holes (not denoted by reference characters) into which the screw members N1 are able to be inserted. The basic mounting portion 47 may be provided on the side upper end and the side lower end of the blower 40 (in a position facing the receiving portion). Also, the first mounting portion 48 is a flat plate portion (having a general V-shape when viewed from the front) that protrudes radially outward from the blower 40. The first mounting portion 48 has screw holes (not denoted by reference characters) that are open to the front and back of the seat, and into which screw members N2 are able to be inserted.

(Duct Member)

The duct member 50 is a pipe member that communicates the blower 40 with the supply portion 70 (that will be described later), and includes a bellows portion 52, a first conduction portion 54f, a second conduction portion 54s, and a second mounting portion 58 (see FIGS. 2 and 3). The bellows portion 52 of the duct member 50 is a portion (that is accordion shaped) provided midway in the duct member 50, and is able to be deformed (i.e., bent). Also, the first conduction portion 54f is a portion that opens to a position facing the blower 40 (i.e., the first opening 44f). The second conduction portion 54s is a portion that opens to a position facing the supply portion 70. Also, the second mounting portion 58 is a flat plate portion that protrudes (in a position facing the first mounting portion 48) to the outside of the duct member 50. The second mounting portion 58 has screw holes (not denoted by reference characters) that open to the front and back of the seat, and into which the screw members N2 are able to be inserted.

[Installation of the Blower]

In this example embodiment, the blower 40 is installed in the center of the upper portion (above the communicating holes 32) of the support bracket 30 (see FIG. 2). At this time, the blower 40 is attached to the support bracket 30 by screwing the basic mounting portion 47 to the receiving members 34 with the screw members N1. Next, the duct member 50 is attached to the blower 40 by arranging the first mounting portion 48 so that it faces the second mounting portion 58 and screwing them together with the screw members N2. At this time, outside air is supplied from the duct member 50 to the blower 40, as will be described later, by communicating the first conduction portion 54$f$ with the first opening 44$f$.

(Cushion)

The cushion 6P is a generally rectangular-shaped member that forms the contour (i.e., the outer shape) of the seat, and includes the flow path portion 80 that will be described later (see FIGS. 3 and 4). A backing layer BL (i.e., a protective layer made of resin) may be formed on the back surface of the cushion 6P. The cushion 6P (i.e., the material thereof) is not particularly limited, and may be made of elastic resin such as polyurethane foam, for example.

(Flow Path Portion)

Figure 4:
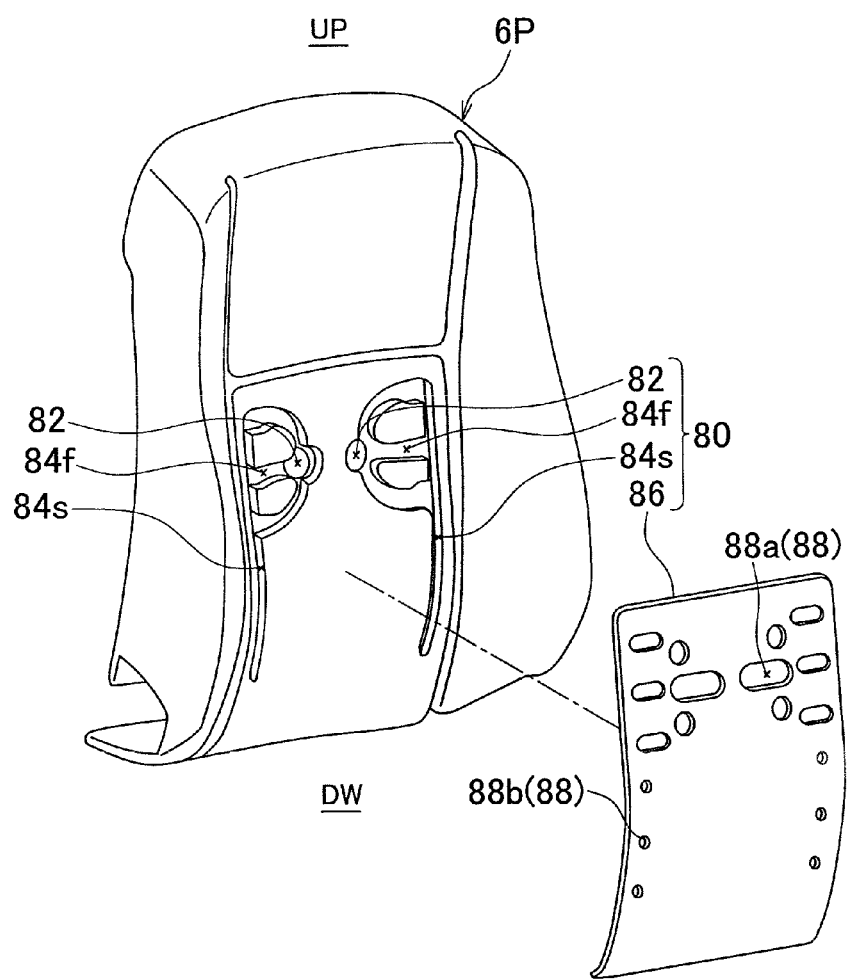
FIG. 4 is an exploded sectional view of a cushion and a cover member of the vehicle seat.

The flow path portion 80 is a flow path that leads the blown air from the blower 40 to the side of the seat where an occupant sits (referred to as the "sitting side" in this specification), and includes a pair of holes 82, communicating portions (84$f$ and 84$s$), and a cover member 86 (see FIGS. 3 and 4). The pair of holes 82 are through-holes that extend through the cushion 6P in the thickness direction, and may be provided (in positions facing the communicating holes 32) in the center of the cushion 6P. Also, each of the communicating portions is a concave portion (that has a groove shape) on the sitting side of the cushion 6P, and includes a first portion 84$f$ and a second portion 84$s$. The second portion 84$s$ is a portion that extends in the vertical direction of the seat, and may be formed on a seat side portion. Also, the first portion 84$f$ is a portion that separates into three branches from the corresponding hole 82, and extends in the seat width direction from the corresponding hole 82 to communicate with the second portion 84$s$. In this example embodiment, the pair of holes 82 may be provided in the center of the seat back 6, and the pair of communicating portions (84$f$ and 84$s$) may be provided axisymmetric (bilaterally symmetrical) sandwiching the center line of the seat back 6.

The cover member 86 is a flat plate member that has a generally rectangular shape (when viewed from the front), and includes a plurality of air holes 88. The cover member 86 (i.e., the material thereof) is not particularly limited, but is typically the same material as that of the cushion 6P. The plurality of air holes 88 are through-holes that extend through the cover member 86 in the thickness direction, and may be formed along the communicating portions (84$f$ and 84$s$) described above. Also, the structure (i.e., the number and diameter) of the air holes 88 may be adjusted or the like as appropriate, though it is preferable that it be such that more air is supplied (i.e., blown) to the upper side of the cushion 6P than to the lower side of the cushion 6P. For example, in this example embodiment, the number and dimensions of air holes 88$a$ on the upper side of the cushion 6P are greater than those of air holes 88$b$ on the lower side (for simplicity, only some of the air holes are denoted by reference characters in FIG. 4).

[Communication of the Flow Path Portion]

In this example embodiment, the cover member 86 is arranged on the sitting side of the cushion 6P, such that the communicating portions (84$f$ and 84$s$) and the holes 82 are closed off (see FIGS. 3 and 4). Next, the cushion 6P is arranged on the sitting side of the frame member 6F. At this time, the cushion 6P is arranged on the support bracket 30 while the pair of holes 82 are arranged aligned with the communicating holes 32. Then one end of the pipe member 46 is communicated with the second opening 44$s$ and the other end of the pipe member 46 is connected to the communicating holes 32. Accordingly, air blown out from the blower 40 passes through the flow path portion 80 (i.e., the holes 82 and the communicating portions 84$f$ and 84$s$) and is supplied to the plurality of air holes 88.

(Cover)

The cover 6S is a bag-shaped member that covers the cushion 6P, and includes the lower band member 60 that will be described later, and the supply portion 70 (see FIGS. 3 and 5). A pair of holes H into which stay members are to be inserted are formed in the upper portion of the cover 6S. The cover 6S (i.e., the material thereof) is not particularly limited, and may be breathable fabric (woven, knit, or non-woven), for example.

(Lower Band Member)

Figure 5:
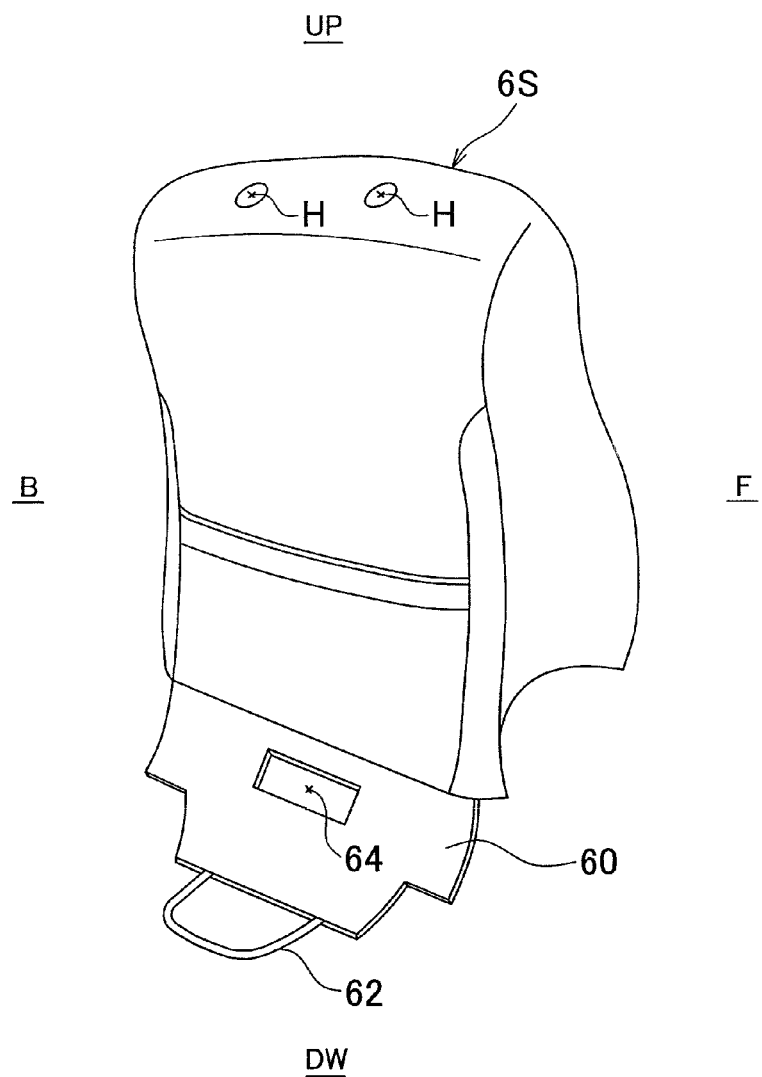
FIG. 5 is a perspective view of a cover and a lower band member of the vehicle seat.

The lower band member 60 is a planar-shaped member that covers the connecting portion of the seat cushion 4 and the seat back 6, and includes a retaining portion 62 and a mounting hole 64 (see FIGS. 3 and 5). The retaining portion 62 is a belt-shaped member and is typically elastic. Also, the mounting hole 64 is a through-hole (having a generally rectangular shape) to which the supply portion 70 that will be described later is able to be attached, and may be provided in the center of the lower band member 60. In this example embodiment, after the retaining portion 62 is attached to one end of the lower band member 60, the other end of the lower band member 60 is sewn (i.e., attached) to a lower portion of the cover 6S. Here, the lower band member 60 (i.e., the material thereof) is not particularly limited, but is preferably material that is more rigid (i.e., stiffer) than the cover 6S. Leather, felt, or fabric impregnated with resin are examples that may be used for this type of lower band member 60 (i.e., stiff material). This lower band member 60 (that is a very rigid member) is able to be prevented from losing its shape when contacted by the legs of an occupant, as well as enables the supply portion 70 (to be described later) to be stably attached.

(Supply Portion)

Figure 6A:
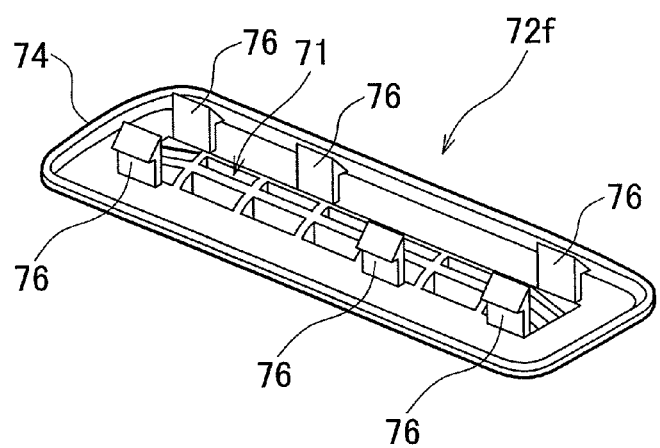
FIGS. 6A and 6B are perspective views of a portion of a supply portion of the vehicle seat, with FIG. 6A being a perspective view of the back side, and FIG. 6B being a perspective view of the front side.
Figure 6B:
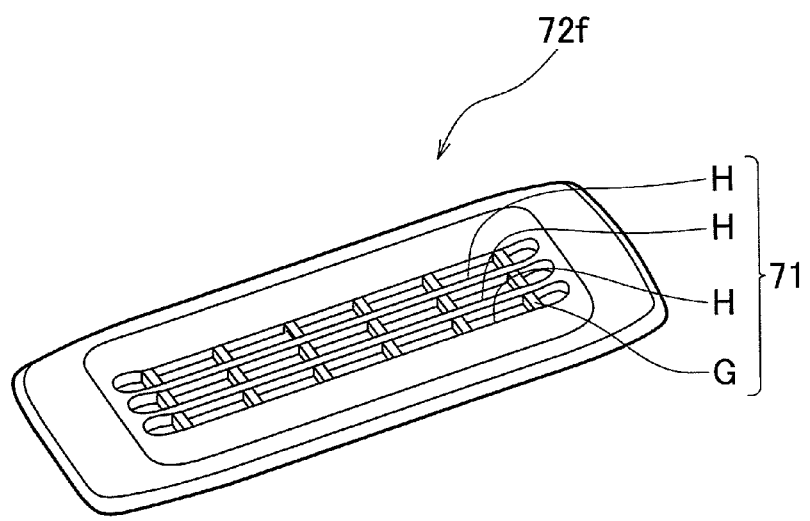
Figure 7A:
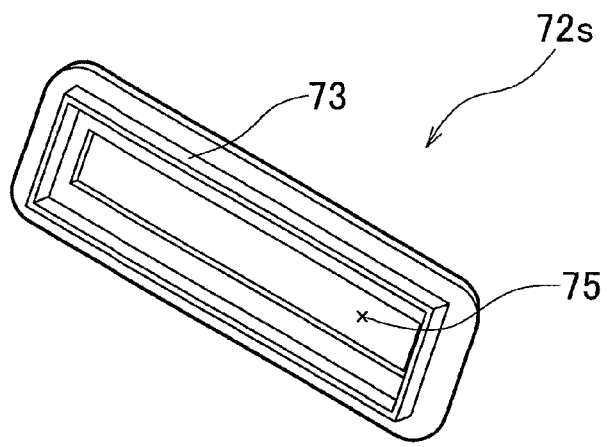
FIGS. 7A and 7B are perspective views of another portion of the supply portion of the vehicle seat, with FIG. 7A being a perspective view of the back side, and FIG. 7B being a perspective view of the front side.
Figure 7B:
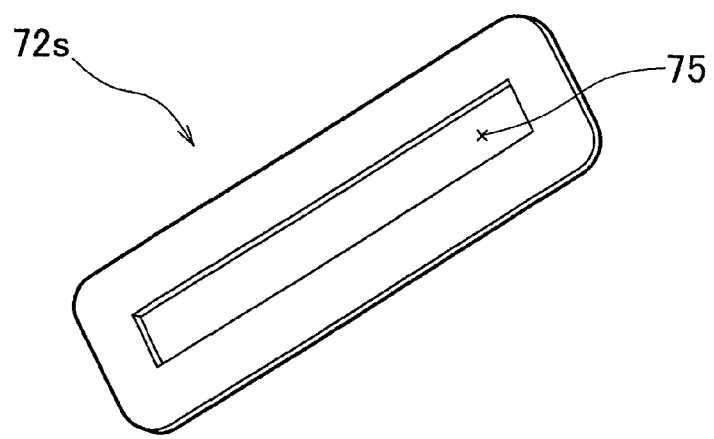

The supply portion 70 is a portion that supplies outside air to the blower 40, and includes a first member 72$f$ and a second member 72$s$ (see FIGS. 3, 6, and 7). Here, the material of the supply portion 70 (i.e., the first member 72$f$ and the second member 72$s$) is not particularly limited, and may be for example thermoplastic resin (polypropylene, vinyl chloride resin, or polyethylene) or thermosetting resin (phenolic resin, melamine resin, epoxy resin, or urea resin). Forming the supply portion 70 out of flexible resin enables the supply portion 70 to bendably deform following the contour of the seat (i.e., enables the seat structure to be nice-looking). For example, the supply portion 70 can be given the appropriate flexibility by forming it out of rubber (natural rubber or synthetic rubber) or an elastomer or the like.

The first member 72$f$ is a flat plate member that has a generally rectangular shape (i.e., a shape similar to that of the mounting hole 64), and includes a first supply port 71, a retaining pawl 74, and a mounting pawl 76 (see FIG. 6A, B). The first supply port 71 includes a plurality of through-holes H that extend in the length direction of the first member 72$f$, and a plurality of lattice portions G that are at right angles to the through-holes H (for simplicity, only some of the structure is denoted by reference characters in FIG. 6B). Also, the retaining pawl 74 is a protruding portion in which the edge portion of the first member 72*f* (i.e., the back surface thereof) is bent. The mounting pawl 76 is a flat plate portion that stands erect on the back surface of the first member 72*f*, and has a turned-back or hooked portion on the tip end. The hooked portion protrudes toward the outside of the first supply port 71. In this example embodiment, the first supply port 71 may be formed in the center of the first member 72*f*, and a plurality of the mounting pawls 76 may be formed around the first supply port 71.

Also, the second member 72*s* is a flat plate member (that has a generally rectangular shape) that follows the first member 72*f*, and includes a second supply port 75 and an erect portion 73 (see FIG. 7A, B). The second supply port 75 (a vertically long through-hole) is arranged aligned with the first supply port 71, and has an opening the size of which enables the plurality (all) of the mounting pawls 76 to be inserted therein. Also, the erect portion 73 is a flat plate portion that stands erect along the circumference of the second supply port 75, and around which a pad member 56 (a ring-shaped elastic member) can be fit.

[Arrangement of the Supply Portion]

In this example embodiment, the supply portion 70 is inserted into the mounting hole 64 (see FIGS. 3 and 5). At this time, the first member 72*f* is arranged on the front side of the lower band member 60 and the second member 72*s* is arranged on the back side of the lower band member 60. Next, the supply portion 70 is attached to the lower band member 60 by retaining the plurality of the mounting pawls 76 to the peripheral edge of the second supply port 75, while pressing the retaining pawl 74 against the lower band member 60 (so that the retaining pawl 74 digs into the lower band member 60). In this example embodiment, the lower band member 60 is a planar-shaped member that is more rigid than the cover 6S is, so the supply portion 70 (that is made of resin) is able to be stably attached. Furthermore, the duct member 50 (i.e., the second opening 44*s*) is communicated with the supply portion 70. At this time, the pad member 56 is fitted around the erect portion 73 and interposed between the duct member 50 and the supply portion 70, thereby preventing or reducing air leakage between the two portions (and forming a structure with excellent seat performance).

After the cushion 6P and the blower 40 are covered by the cover 6S, the retaining portion 62 is retained by the S-spring 14, while pulling one end side of the lower band member 60 down below the seat cushion 4 (see FIGS. 3 and 8). In this way, the connecting portion of the seat back 6 and the seat cushion 4 is covered by the lower band member 60, so the appearance of the seat can be improved. Also, the supply portion 70 is arranged in a position where it will not really stand out, by arranging the lower band member 60 below the seat.

[Driving the Blower]

In the vehicle seat according to this example embodiment shown in FIG. 3, air that is blown out from the blower 40 is blown at an occupant through the flow path portion 80, while outside air is supplied to the blower 40. At this time, in this example embodiment, outside air is taken in from the supply portion 70 of the lower band member 60 and supplied to the blower 40 through the duct member 50. Then the air that is blown out from the blower 40 is blown at an occupant through the flow path portion 80 (i.e., the holes 82, the communicating portions 84*f* and 84*s*, and the air holes 88). In this way, in this example embodiment, the supply portion 70 is provided in the lower band member 60 (i.e., in a position where it does not really stand out). Also, preferentially taking in outside air outside of the seat from the supply portion 70 makes it possible to prevent or reduce outside air that has passed through the cover 6S from being drawn in. Therefore, this example embodiment enables outside air to be supplied to the blower 40 while maintaining seat performance at much as possible.

<Second Example Embodiment>

The vehicle seat according to this second example embodiment is provided with a basic structure that is almost the same as that of the vehicle seat 2 according to the first example embodiment, so common structure will be denoted by corresponding reference characters, and detailed descriptions of that structure will be omitted. In this example embodiment, the duct member 50 is communicated with the supply portion 70 via an introducing tube 57 (i.e., a hollow cylindrical member) (see FIG. 9).

In this example embodiment, the duct member 50 is attached to the support bracket 30, and the supply portion 70 is attached to the lower band member 60. In this way, the duct member 50 and the supply portion 70 are attached to different members, and are thus able to move relative to one another. As a result, it is possible that the introducing tube 57 may become disconnected due to relative movement between the duct member 50 and the supply portion 70. Therefore, in this example embodiment, the introducing tube 57 (either all or a portion thereof) is made in a bellows shape, such that it can bendably deform according to relative movement between the supply portion 70 and the duct member 50. Thus, by interposing the introducing tube 57 (that is bellows-shaped) between the duct member 50 and the supply portion 70, this example embodiment makes it possible to stably prevent or reduce air leakage between these portions.

The vehicle seat according to this example embodiment is not limited to the example embodiments described above. That is, other various example embodiments are also possible. For example, (1) in this example embodiment, the blower 40 is communicated with the supply portion 70 by the duct member 50, but the duct member 50 may also be omitted. (2) Also in this example embodiment, an example of the structure of the lower band member 60 is described, but this is not in any way intended to limit the structure of the lower band member. For example, after attaching a retaining portion to the other end of the lower band member, one end of the lower band member may be sewn (i.e., attached) to a rear portion of the cover of the seat cushion. In this case, the retaining portion is retained by the frame member of the seat back. Also, a J-hook may be also be used as the retaining member.

(3) Also in this example embodiment, an example of the structure of the supply portion 70 is described, but this is not in any way intended to limit the structure of the supply portion. The shape (when viewed from the front) of the supply portion may be any one of various shapes, such as that of a circle, an oval, or a triangular or the like. Also, one or a plurality of the supply portions may be provided on the lower band member. (4) Also in this example embodiment, the supply portion 70 is described as being provided on a lower portion of the seat back 6, but this is not in any way intended to limit the position where the supply portion is arranged. The supply portion may be arranged on a rear portion of the seat cushion, or between the seat cushion and the seat back, or the like.

(5) Also in this example embodiment, an example of the structure of the flow path portion 80 is described, but this is not in any way intended to limit the structure of the flow path portion. For example, a branching communicating path (one) may be formed in the cushion. Also, the air holes may be omitted by using a breathable cover member.

What is claimed is:

1. A vehicle seat comprising:
   a seat cushion;
   a seat back that is rotatably connected to the seat cushion so as to be reclined and raised with respect to the seat cushion, the seat back including:
      a cushion having a flow path portion for guiding air toward a sitting side of the seat back, the cushion forming a contour of the seat back,
      a cover that covers a surface of the cushion, and
      a blower arranged inside the seat back;
   a lower band member that covers a rear end portion of the seat cushion and a lower end portion of the seat back; and
   a supply portion that is provided in the lower band member and communicates an inside of the seat back with an outside of the seat back such that outside air is supplied to the blower,
   wherein the blower is configured to draw in the outside air from the supply portion and to blow air through the flow path portion toward the sitting side of the seat back, and wherein the supply portion is a resin member that is insertable into a hole in the lower band member.

2. The vehicle seat according to claim 1, wherein the lower band member is a planar-shaped member that has a rigidity that is higher than a rigidity of the cover.

3. The vehicle seat according to claim 1, further comprising a duct member that communicates the supply portion with the blower, wherein the outside air taken in from the supply portion is supplied to the blower through the duct member.

4. The vehicle seat according to claim 1, wherein the lower band member is sewn at a first end portion to a lower portion of the cover, and has a retaining member on a second end portion, and is retained by a bottom of the seat cushion.

5. The vehicle seat according to claim 1, wherein the seat back further has a frame that is a basic structure of the seat back, and the lower band member has a retaining member on a first end portion and is retained by the frame, and a second end portion is sewn to a bottom of the seat cushion.

6. The vehicle seat according to claim 1, wherein the lower band member is provided so as to cover the seat back and the seat cushion from below the seat back.

* * * * *